Aug. 30, 1932.   C. G. OLSON   1,874,595

SELF LOCKING SCREW

Filed Dec. 26, 1930

Inventor:
Carl G. Olson
By Cleaver, Cox & Moore
attys.

Patented Aug. 30, 1932

1,874,595

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

SELF-LOCKING SCREW

Application filed December 26, 1930. Serial No. 504,765.

My invention relates generally to self-locking screws, and more particularly to devices of the set screw type, wherein the external surfaces of the screw are adapted to automatically and yieldingly bear against the companion surfaces of the threads in the work piece.

It is one of the primary objects of my invention to provide a self-locking screw which is more positive and effective in its binding action than screws of this general type which have been employed heretofore.

More specifically, it is an object of my invention to provide a screw in which substantially the entire thread surfaces thereof co-act with the companion threaded surfaces of the work piece to frictionally resist an unscrewing force.

Still more specifically, my invention contemplates the provision of a screw in which the threads normally occupy a spiral position, so that when the screw is inserted within a threaded aperture of a work piece, these spiral external screw surfaces will frictionally engage the companion thread surfaces of said work piece.

Numerous other objects and advantages will be more apparent from the following detailed description when considered in connection with the accompanying drawing, wherein—

Figure 1:
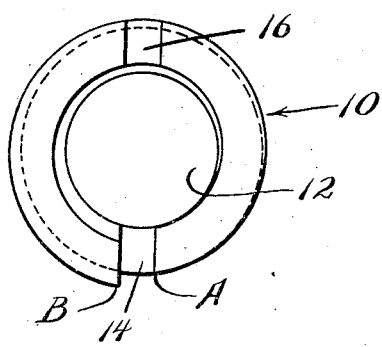
Figure 1 is a plan view of a set screw constructed in accordance with the teachings of my invention and provided with a single spiral external thread surface.
Figure 2:
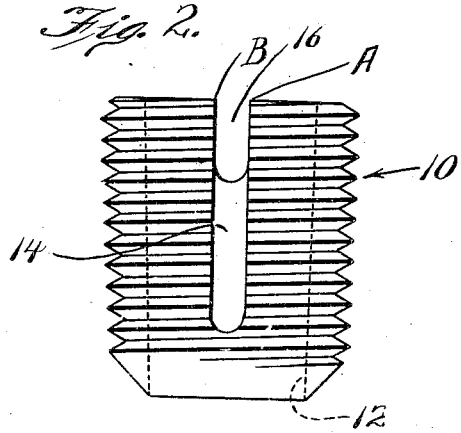
Figure 2 is a side elevational view of the device shown in Figure 1.

Referring now to the drawing more in detail wherein like numerals have been employed to designate similar parts through the various figures, it will be observed that one embodiment of the invention resides in the provision of a screw, which I have designated generally by the numeral 10 in Figures 1 and 2. This screw is formed with a central aperture 12 which extends throughout the length of the screw, and it will be noted that the sides of the screw are tapered, the smaller end being presented at the lower end of the screw, and the larger end at the upper end thereof. In addition to this tapered arrangement, I provide a recess 14 which extends a greater portion of the distance from the top of the screw on one side thereof and a shallower slot 16 which is disposed diametrically opposite the slot 14. The slot 16 is merely provided to facilitate the use of a screw driver (not shown), said screw driver being adapted to span the central opening or aperture 12 and to be received by the slots 14 and 16.

Particular attention is directed to the fact that the longer slot 14 facilitates the shaping or forming of the threaded body so as to present a substantially continuous spiral thread surface, which begins at a point designated by the letter A, Figure 1, and continues in a counterclockwise direction to a point B. Thus, the point B normally projects outwardly, and when the screw is tightened within a work piece, this point serves as an effective locking element. The sharpness of the point B coupled with the normal tendency for said point to be urged outwardly against the companion threaded surface of the work piece, renders the same very effective in preventing the inadvertent loosening of the screw. In addition to this point B, substantially the entire surface area of the thread extending between the points B and A resiliently bears against the thread surface of the work piece, and thereby very effectively binds the screw within said work piece.

Figure 3:
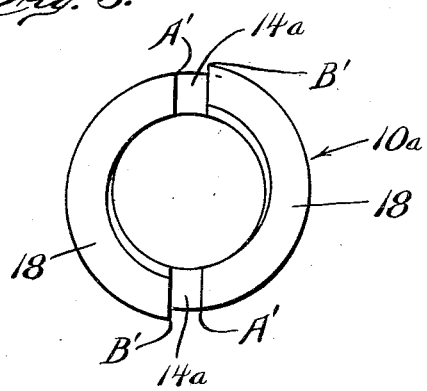
Figure 3 is a plan view of a modified or alternative form of screw, in which the body of the screw presents a pair of threaded sections, each of said sections having external spirally disposed thread surfaces.
Figure 4:
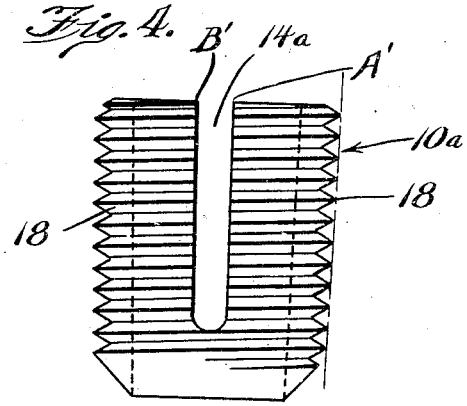
Figure 4 is a side elevational view of the device shown in Figure 3.

In Figures 3 and 4 I have shown an alternative form of screw, which is designated generally by the numeral 10a. This screw 10a differs from the screw 10 in that it is formed with a pair of spirally deflected threaded sections 18, which are separated by slots 14a, which correspond with the slot 14 and the screw 10. The threads in each of the sections 18 being to spiral outwardly from points $A^1$ and continue to the points $B^1$. Thus, it may be stated that substantially the entire length of the threads of the screw serve to frictionally engage the companion surfaces of the threads in the work piece. The only portions of the screw which do not frictionally engage the work piece are those portions which are eliminated by the presence of the slots 14a.

Figure 5:
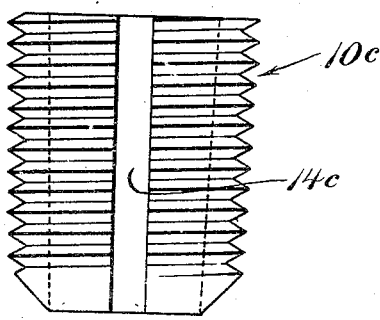
Figure 5 is a side elevational view of a spirally formed screw, which is provided with a recess or slot extending throughout the length of the screw body.

In Figure 5 I have shown a still further modified screw designated generally by the numeral 10c. This screw differs from the screws just described in that it is provided with a slot 14c extending throughout the entire length of the screw body. This screw is spirally formed and slightly tapered so as to effect the automatic locking of the screw within the work piece.

From the foregoing it will be observed that by having the spiral arrangement of the thread surfaces, I present a screw which very effectively and automatically binds itself within a work piece, or, in other words, is very effectively self-locking. The tapered arrangement of the screw facilitates the insertion thereof within the work piece and cooperates with the spiral configuration to render the same very practical. Screws of this type may be secured in position by the use of an ordinary screw driver or other suitable device.

Figure 6:
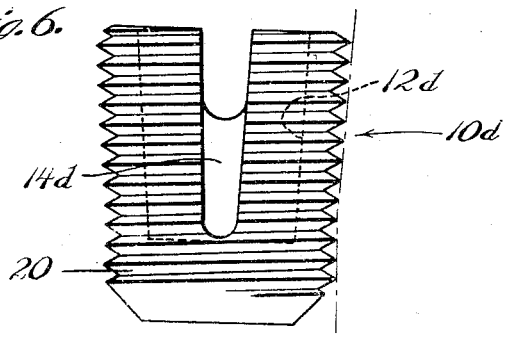
Figure 6 is a side elevational view of a screw having a solid end as distinguished from the other screws which are provided with central apertures extending completely therethrough.

In Figure 6 I have shown a screw designated generally by the numeral 10d. A plan view of the screw 10d would be similar to the plan view of the screw 10 shown in Figure 1. However, the screw 10d differs from the screw 10, in that a central aperture or recess 12d extends only partially through the screw, thereby presenting a solid screw section 20. This solid screw section 20 is of the usual cylindrical cross-section, whereas the portion of the screw extending upwardly from the solid section 20 is formed spirally, as shown in Figure 1. A slot 14d is provided in the screw body to facilitate the spiral forming thereof. The initial cross-section of the screw 14d is cylindrical and the aperture 12d is cylindrical. However, after the portion of the screw above the solid section 20 is spirally formed, as, for example, by a punching operation, the wall surrounding the aperture or recess 12d and the outer threaded surface of the screw positioned above the solid section 20 assume a tapered form. Spirally forming the screw obviously widens the upper end of the slot 14d, as clearly shown in the drawing.

Thus, it will be apparent that the screw 10d differs from the other screws, in that it is provided with a solid section and a spirally formed section extending above said solid section.

Attention is directed to the fact that the taper of the screws with respect to their axes results from the spiral forming thereof. Therefore, referring to Figure 1, it will be seen that the side of the screw 10, which includes the edge A, Figure 1, is parallel with the screw axis. However, in progressing from the point or edge A in a counter-clockwise direction, it will be seen that the threaded surface of the screw 10 progressively tapers with respect to the screw axis, said taper progressively increasing from substantially zero at the point or edge A to the point or line of maximum deflection B. The screw 10, as well as the screw 10a, are thus provided with a non-tapering side portion which includes the points or edges A and A', as well as side portions which progressively increase in taper to the points or edges B and B'. Due to the presence of the slots 14 and 16 of the screw 10, the progressing side taper of the screw continues for less than one convolution of the screw thread, but enables a substantial portion of the threaded surfaces to frictionally engage the companion threaded surfaces of the work piece with which it is associated.

It should also be noted that the diameter of the screw 10 taken at the point A is greater than the normal cylindrical diameter of the screw, and that the diameter of the screw 10a taken at the point A' is substantially equal to the diameter of the normal cylindrical screw. The diameter of these screws taken at any point is not less than the diameter of the normal cylindrical screw. Thus, when screws of my improved design are applied to the work piece, the points, such as points A and A' of the screws, which might be referred to as the low points of the screw, bear against the companion thread surfaces of the work piece and thereby provide a support to counteract the diametrically opposite force resulting from the resilient engagement of the screw threads with the work piece. In other words, the force exerted as a result of the spiral configuration of the screw is positively counteracted by the engagement of the diametrically opposite portion of the screw with the threads of the work piece. The locking effectiveness of such a construction will be more apparent when reference is made to Figure 1, wherein the point of maximum displacement B is shown. When this screw 10 is applied to the work piece, the point B is urged inwardly in conformity with the cylindrical contour of the threaded opening in the work piece, and the diametrically opposite portion of the screw 10 cooperates with the threads of the work piece in providing a support to counteract the inward movement of the point B, and in this manner causes the point B to be effectively urged into locking relation with the companion surfaces of the work piece. The same is also true of the screw 10a, as shown in Figure 3, wherein the forces transmitted to or experienced by the points B' as the screw is being inserted within a threaded aperture, are counteracted by the positive engagement of the diametrically opposite portions of the screw, as, for example, the points A' with the companion thread surfaces of the work piece.

The structure described above should be clearly distinguished from known types of deflected or offset self-locking screws, wherein the entire portion of a threaded section of the screw is shifted in order to position one portion thereof out of the normal cylindrical form of the screw. In these conventional devices the frictional engagement of the projecting portions of the screw are counteracted only by the resilient connection of the deflected threaded section of the screw with the solid end section thereof. In other words, in these conventional devices the frictional engagement of the outwardly projecting portions of the threaded sections of the screw is not positively counteracted by diametrically opposite portions of said threaded sections. In screws of my improved construction, however, the force tending to inwardly urge the projecting portions of the threaded sections, namely, the points B and B' shown in Figures 1 and 3, is not only counteracted by the inherent resiliency of the screw body, but is also counteracted by the diametrically opposite portions of the screw body.

Having thus described my invention, what I claim as new and desire to secure by Letters Patent is:

1. A screw including a helically threaded section which is spirally disposed and flexible diametrically to render said screw self-locking when applied to a work piece.

2. A screw including a threaded section normally deflected spirally outward with respect to the screw axis to render the same self-locking when applied to a work piece, said deflected section presenting a substantial length of thread surface which is adapted to frictionally engage companion thread surfaces of said work piece.

3. A screw including a threaded section which is normally deflected spirally outward from a point of substantially zero deflection on one side of said screw gradually to a point of maximum deflection on the opposite side of said screw, whereby to render the same self-locking when applied to a work piece.

4. A screw including a threaded section sprung spirally outward from the usual cylindrical screw contour, whereby to present a substantial length of thread surface for binding within a work piece, said length being greater than one-half of the screw circumference.

5. A screw including a threaded section normally deflected outwardly with respect to the screw axis to render the same self-locking when applied to a work piece, said deflected section presenting a substantial spiral length of thread surface which is adapted to frictionally engage companion thread surfaces of said work piece and being slightly tapered to facilitate the insertion thereof within the aperture of said work piece.

6. A screw including a spirally deflected threaded section which is adapted to render said screw self-locking when applied to a work piece, the body portion of said screw being provided with a cylindrical recess to facilitate the spiral deflection of the threaded section.

7. A screw including a spirally deflected threaded section which is adapted to render said screw self-locking when applied to a work piece, the body of said screw being provided with a pair of oppositely disposed recesses extending longitudinally thereof.

8. A screw having a central aperture and a plurality of threaded sections surrounding said aperture, said sections being spirally deflected, whereby the surfaces of the threads of each section present substantial lengths of thread surfaces which are adapted to frictionally engage companion thread surfaces of a work piece.

9. A screw including a threaded section normally deflected outwardly with respect to the screw axis so as to render the same self-locking when applied to a work piece, the outer surface of said threaded section being progressively tapered with respect to the screw axis from a given point to a point of maximum taper.

10. A screw including a threaded section normally deflected outwardly with respect to the screw axis to render the same self-locking when applied to a work piece, the external surface of said threaded section having one portion which is substantially parallel with the axis of the screw and another portion which is tapered with respect to said axis.

In witness whereof, I have hereunto subscribed my name.

CARL G. OLSON.